Figure 1:
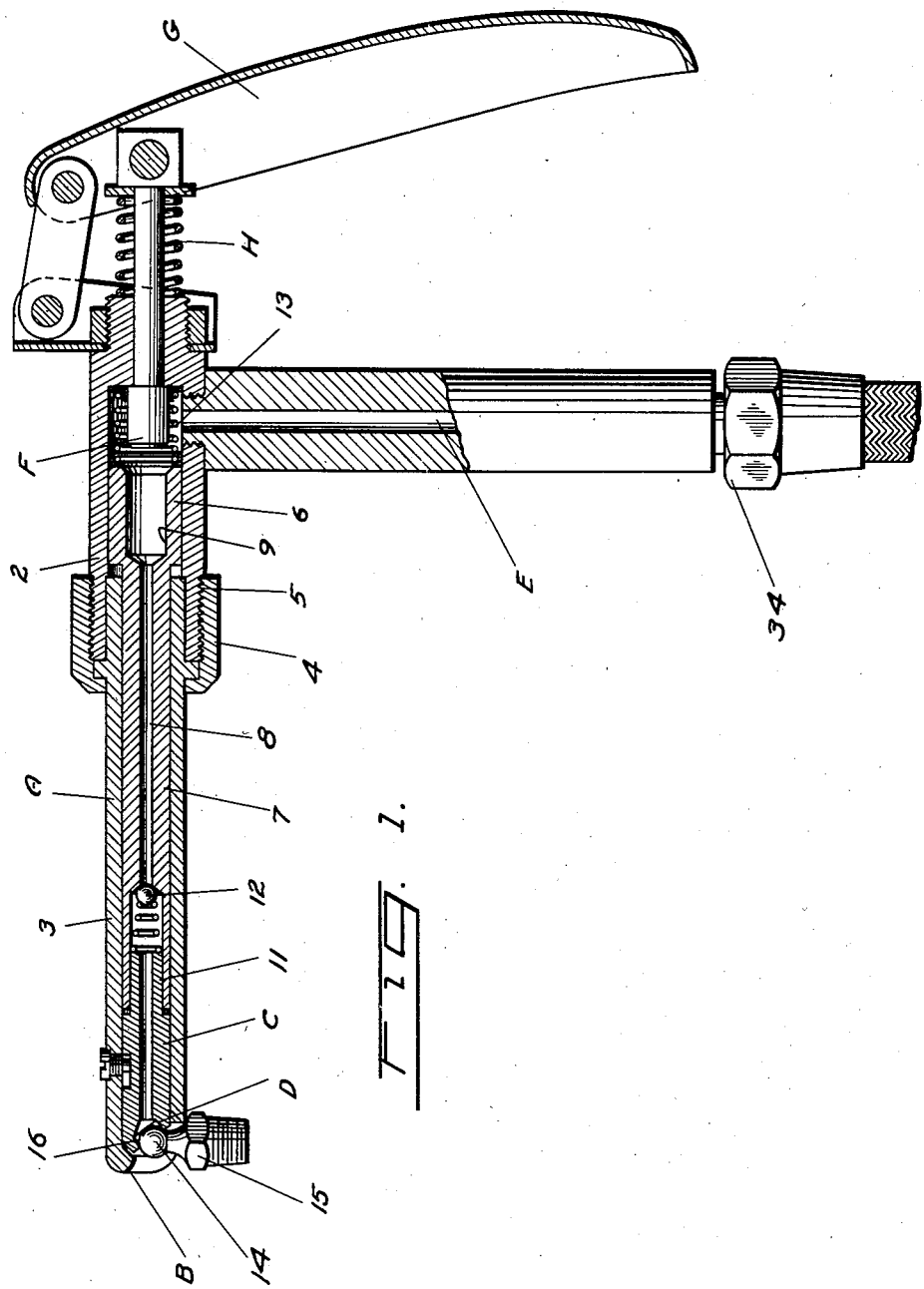

March 26, 1935.  J. L. CREVELING  1,995,377
LUBRICATING DEVICE
Filed March 6, 1933  2 Sheets-Sheet 1

INVENTOR.
JOHN L. CREVELING
BY John A. Watson
ATTORNEY.

March 26, 1935. J. L. CREVELING 1,995,377
LUBRICATING DEVICE
Filed March 6, 1933 2 Sheets-Sheet 2
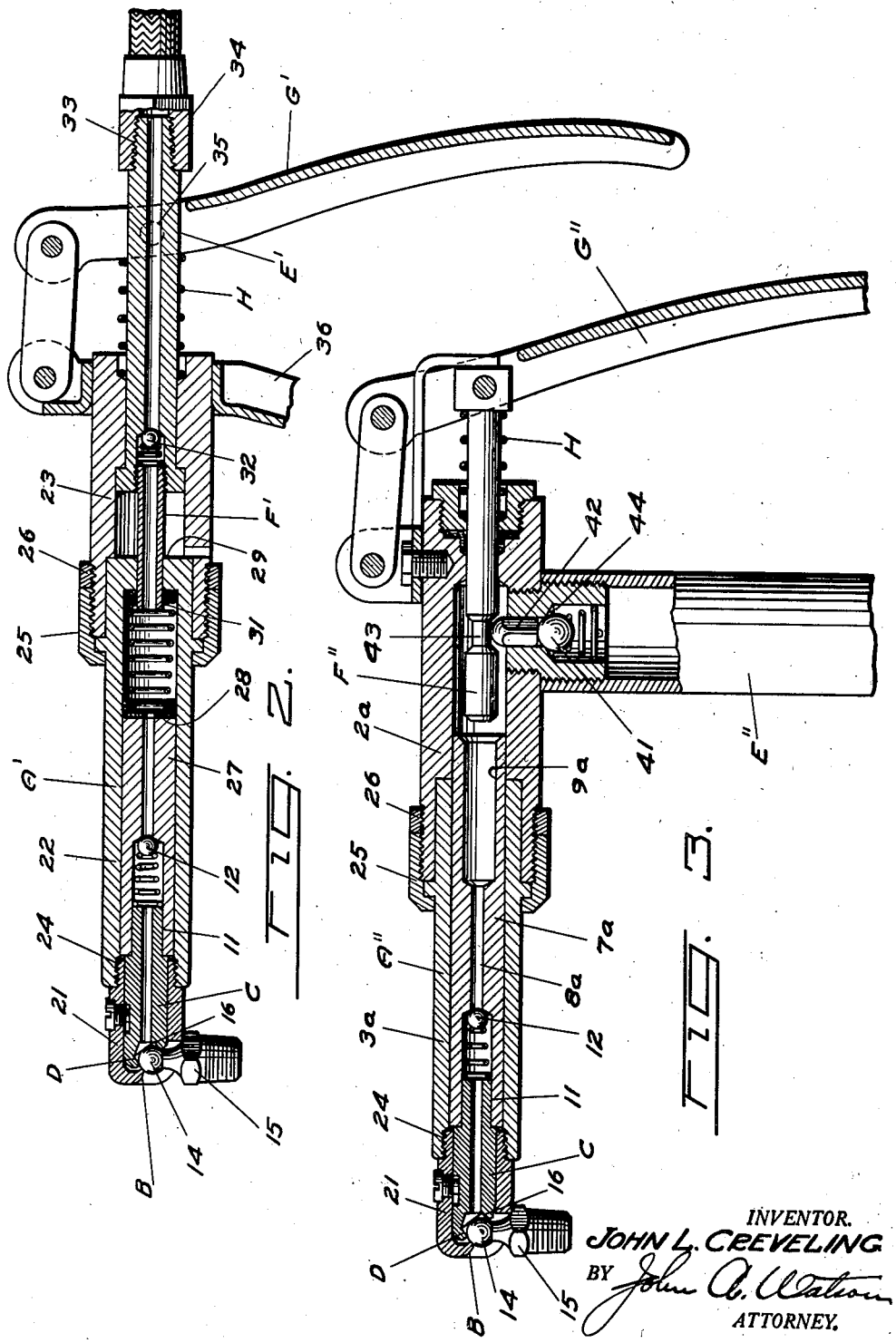
INVENTOR.
JOHN L. CREVELING
BY John A. Watson
ATTORNEY.

Patented Mar. 26, 1935

1,995,377

UNITED STATES PATENT OFFICE 1,995,377

LUBRICATING DEVICE

John L. Creveling, near Tucson, Ariz., assignor to The Lubrication Corporation, South Bend, Ind., a corporation of Delaware Application March 6, 1933, Serial No. 659,642

11 Claims. (Cl. 221—47.4)

This invention relates to improvements in lubricating devices and more particularly to lubricant discharge nozzles of the clamp type, incorporating manually actuated pressure booster mechanism.

Heretofore, for servicing lubricant receiving fittings, lubricant discharge nozzles which include mechanism operable by the pressure under which the lubricant is admitted to the nozzle for clampingly engaging the nozzle with the fitting have been used, but in such installations, when increased lubricant pressure was needed to overcome resistance to the flow of lubricant into the bearing or part to be lubricated, booster pumps have been employed in the lubricant supply line to increase the pressure on the lubricant admitted to the nozzle thereby subjecting a portion of the supply line to the increased lubricant pressure.

An object of my invention is to provide a clamp type lubricant discharge nozzle including manually operable means within the nozzle for discharging small quantities of lubricant into the fitting under increased pressure above that upon any portion of the lubricant supply line.

Another object is to provide a discharge nozzle of the type described wherein the booster mechanism may be operated to shut off the flow of lubricant to the nozzle at will independently of its booster function.

Other objects, the advantages and uses of the invention will be apparent after reading the following description and claims and after consideration of the accompanying drawings forming a part of this specification, in which:

Figs. 1, 2 and 3 are sectional views illustrating three different forms of the nozzle and booster mechanism.

In general, the type of lubricant discharge nozzle and booster mechanism selected for illustration herein comprises, a rigid barrel A provided with a fitting engaging jaw B at its outer end, a tubular member C, located within the barrel A having a discharge orifice D, in registration with the jaw B, a short rigid lubricant supply conduit E for admitting lubricant to the bore of barrel A, a plunger F mounted for reciprocation within the barrel A and member C, a manually operable lever G for reciprocating the plunger F, and a spring H for normally urging the plunger F to its retracted position.

Referring particularly to Fig. 1 of the drawings, the barrel A of the discharge nozzle and booster illustrated therein includes a rearward section 2 and a forward section 3 secured to one another by a sleeve 4 having a threaded connection with the section 2 as shown at 5. This arrangement permits the rotation of the forward section relative to the rearward section so that the position of the fitting engaging jaw B may be varied relatively to the conduit E, thus permitting the nozzle to be more readily employed to service fittings located in relatively inaccessible places. The internal diameter of the section 2 is greater than that of the section 3 and provides a cylinder within which the enlarged head 6 of the inner end of a tubular member 7 is slidably mounted. The bore 8 of the member 7 is enlarged in the head portion 6 to provide a high pressure cylinder 9 which the plunger F may enter when urged inwardly of the barrel A against the force of the spring H. The tubular member 7 has a swivel connection 11 with the part C and a discharge check valve 12 is located between the aligned bores of the member 7 and the part C. A compression spring 13 located within the bore of the barrel section 2 may be employed to provide a constant yielding thrust upon the part C through the member 7, thus tending to urge the discharge orifice D of part C toward the jaws B so that the spherical head 14 of a lubricant receiving fitting 15 may be clamped yieldingly between the jaw B and the walls 16 of the discharge orifice D upon the initial engagement of the discharge nozzle with the fitting.

When the lubricant under pressure is admitted through the conduit E to the bore of the barrel section 2, the part C is subjected to an additional thrust outwardly in proportion to the pressure under which the lubricant is admitted to the nozzle by virtue of its action upon the relatively large cross sectional area of the head 6 of the member 7, and the nozzle is thus clampingly engaged with the fitting under forces in proportion to the lubricant pressure.

Should it be found, during the servicing operation, that the lubricant pressure admitted to the nozzle through the conduit E is not sufficiently great to overcome the resistance to the passage of lubricant into the bearing or other mechanism with which the fitting is associated, the operator may press upon the lever G to cause the plunger F to advance into the cylinder 9 of the member 7 with the result that an exceedingly high pressure may be developed therein to force the lubricant into the bearing to clear away the obstruction or congealed and solidified lubricant responsible for the resistance to the admission of the lubricant thereto under normal line pressure. It will be noted that the plunger F is diametrically enlarged at its forward end so that when admitted to cylinder 9, the lubricant pressure rearwardly of the plunger may aid the advance of the plunger into the cylinder. If desired, the plunger F may be moved into the cylinder 9 of the member 7 at any time to cut off the flow of lubricant from the conduit E into the bore 8 and therefore serve the added function of a shut-off valve for the nozzle. It will be noted that during the operation of the plunger F in the cylinder 9 that the lubricant supply admitted to the nozzle through the conduit E is shut off, limiting those parts subjected to increased lubricant pressure to the tubular member 7, and the discharge part C.

The rigid conduit E and the lever G are so related as to provide a plier type hand grip assembly of the character which may readily permit the operator to apply quick forceful plunger movements resulting in extremely high pressures sufficient to clear away the most highly congested lubricant bearing or duct.

In Fig. 2 another form of the nozzle and booster is shown wherein the barrel A' includes three sections 21, 22 and 23, respectively, the section 21 being that portion of the barrel upon which the clamping jaw B is located. The sections 21 and 22 are secured to one another by screw threads 24 and the sections 22 and 23 are secured together by a sleeve 25 in the same fashion as described in connection with the sections 2 and 3 of the nozzle of Fig. 1. A lock washer 26 may be employed to lock the sleeves 25 in place after adjustment of the parts have been made. A tubular member 27 is fixed to the inner end of the discharge part C and is slidably disposed within the bore of the barrel section 22. A skirted packing ring 28 is disposed against the rearward face of the member 27 to provide a seal between the member and the inner walls of the barrel. The inner end of the barrel section 22 is formed with an apertured closure wall 29 through which a tube of relatively small diameter comprising the plunger F' extends. A packing gland 31 may be employed to form a seal between the plunger and the partition wall. The inner end of the rigid conduit E' forming the inlet conduit for the nozzle is telescopically mounted within the barrel section 23 and serves as a support for the plunger F'. Communication between the conduit and the plunger may be established through an inlet check valve 32. The outer end of the conduit E', as in the gun of Fig. 1, is threaded at 33 for connection to a lubricant supply hose coupling 34 forming a part of the pressure lubricant supply. The lever G' is pivotally connected at 35 to the conduit E' and a stationary hand grip 36 is mounted upon the barrel A' substantially parallel to the hand lever G' to facilitate manual operation of the lever.

In operation, lubricant under pressure admitted to the conduit E' is free to pass through the check valve 32, the plunger F, and into the barrel section 22 where it may pass through the tubular member 27 and the part C into the lubricant receiving fitting 15. The lubricant under pressure at the rearward end of the member 27 acts thereupon to urge it outwardly of the barrel A' and thus to cause the part C, secured thereto, to engage the head 14 of the fitting and to form a lubricant tight seal therewith as described. During the normal discharge of lubricant through the nozzle under line pressure the hand lever G' and grip 36 serve as a convenient means for supporting the nozzle with the lever G' in constant readiness for the manual operation of the booster mechanism. When the hand lever G' is depressed to provide increased pressure at the nozzle the valve 32 will be closed by virtue of the increased pressure of the lubricant forwardly of the valve as the plunger F' is urged into that space to the rear of the member 27 within the barrel section 22 to displace lubricant therein.

In Fig. 3 a form of nozzle and booster is shown which is similar in most respects to the apparatus of Fig. 1 but which differs primarily in the addition of an inlet valve 41, of the spring pressed ball type, located at the inner end of the conduit E'' at its juncture with the barrel A'''. The valve 41 includes an operating pin 43 which contacts the ball of the valve at one end and is arranged with its opposite end extending into the bore of the barrel section 2a. The plunger F'' may be formed with an annular groove 43 in its side walls within which the upper end of the valve pin normally lies, thus permitting the valve ball to rest upon its seat 44. The location of the groove 43 in the plunger F'' is such as to register with the pin 42 when the plunger is in its fully retracted position. The side walls of the groove 43 are preferably inclined and the head of the pin rounded as shown so that axial movement of the plunger will cause the pin to be urged downwardly to open the valve 41 and admit lubricant from the source of supply to the barrel A'''. The barrel sections 2a and 3a are of the same internal diameter and joined to form a continuous bore within which the tubular member 7a is slidably mounted. The bore 8a of the member 7a is enlarged at 9a to form a high pressure cylinder within which the plunger F'' may operate as described in connection with the nozzle of Fig. 1.

In operation, this form of the nozzle and booster is identical to that of the nozzle of Fig. 1 except that at all times when the nozzle is not in use the lubricant supply is automatically shut off.

It should be understood that the described embodiments of the invention herein set forth are presented for the purpose of illustration only, and various changes may be made therein without departing from the spirit and scope of the invention.

I claim:

1. A lubricating device comprising, means providing a lubricant passageway, lubricant pressure operated clamping means for establishing a lubricant tight connection between said passageway and a lubricant receiving fitting, means for connecting said passageway with a source of lubricant supply under pressure, and means operable in said passageway for subjecting the lubricant in said passageway to increased pressure, said last named means being operable conjointly by manual force and by pressure of the lubricant from said source of supply.

2. A lubricating device comprising, a barrel adapted for communication with a source of pressure lubricant supply, a movable assembly slidably mounted in said barrel, said assembly having a passageway therethrough terminating at one end in a discharge orifice and at its opposite end in a high pressure cylinder, and a plunger mounted for reciprocation in said barrel adapted to be thrust into said high pressure cylinder to apply increased pressure to the lubricant in said passageway, said barrel and said assembly including means for clampingly engaging a lubricant receiving fitting upon the forward thrust of said assembly under influence of lubricant under pressure admitted to the nozzle and under the increased lubricant pressure built up by the actuation of said plunger.

3. A lubricating device comprising, a barrel having an overhanging jaw at the forward and open end thereof for engagement with a lubricant receiving fitting, a movable assembly slidably mounted within said barrel providing a passageway therethrough the forward end of which terminates in a discharge orifice in registration with said jaw and the rearward end in a high pressure cylinder, means for admitting lubricant under pressure to said barrel at the rear of said assembly whereby the lubricant may pass through said passageway and may act on said assembly to urge it toward said jaw, and a plunger mounted for reciprocation in said barrel and adapted to enter said cylinder to increase the pressure of lubricant in said passageway.

4. A lubricating device comprising, a barrel having an overhanging jaw at the forward and open end thereof for engagement with a lubricant receiving fitting, a movable assembly slidably mounted within said barrel providing a passageway therethrough the forward end of which terminates in a discharge orifice in registration with said jaw and the rearward end in a high pressure cylinder, means for admitting lubricant under pressure to said barrel at the rear of said assembly whereby the lubricant may pass through said passageway and also act on said assembly to urge it toward said jaw, a plunger mounted for reciprocation in said barrel and adapted to enter said cylinder to increase the pressure of lubricant in said passageway, and a shut-off valve for controlling the admission of lubricant to said barrel upon the initial movement of said plunger inwardly of the barrel.

5. A lubricating device comprising, a barrel having an overhanging jaw at the forward and open end thereof for engagement with a lubricant receiving fitting, a movable assembly slidably mounted within said barrel providing a passageway therethrough the forward end of which terminates in a discharge orifice in registration with said jaw and the rearward end in a high pressure cylinder, means including a rigid conduit fixed to said barrel, for admitting lubricant under pressure to said barrel at the rear of said plunger assembly whereby the lubricant may pass through said passageway and also act on said plunger assembly to urge it toward said jaw, a piston plunger mounted for reciprocation in said barrel and adapted to enter said cylinder to increase the pressure of lubricant in said passageway, and a hand lever for manually operating said plunger, said hand lever being disposed in substantially parallel relationship with said conduit.

6. A lubricating device comprising, a barrel having an overhanging jaw at the forward and open end thereof for engagement with a lubricant receiving fitting, a movable assembly slidably mounted within said barrel providing a passageway therethrough the forward end of which terminates in a discharge orifice in registration with said jaw and the rearward end in a high pressure cylinder, means including a rigid conduit fixed to said barrel, for admitting lubricant under pressure to said barrel at the rear of said plunger assembly whereby the lubricant may pass through said passageway and also act on said assembly to urge it toward said jaw, a plunger mounted for reciprocation in said barrel and adapted to enter said cylinder to increase the pressure of lubricant in said passageway, and a hand lever pivotally mounted on said barrel for manually operating said plunger, said hand lever being disposed in substantially parallel relationship with said conduit, and at right angles to the axis of said barrel.

7. A lubricating device comprising, a barrel including a pair of aligned tubular sections having at times a swivel relationship with one another, said barrel having an overhanging jaw at the forward and open end thereof for engagement with a lubricant receiving fitting, a movable assembly slidably mounted within said barrel providing a passageway therethrough the forward end of which terminates in a discharge orifice in registration with said jaw and the rearward end in a high pressure cylinder, said assembly including a pair of aligned members having a swivel connection with one another, means including a rigid conduit fixed to said barrel, for admitting lubricant under pressure to said barrel at the rear of said assembly whereby the lubricant may pass through said passageway and also act on said assembly to urge it toward said jaw, a plunger mounted for reciprocation in said barrel adapted to enter said cylinder to increase the pressure of lubricant in said passageway, and a hand lever pivotally mounted on said barrel for manually operating said plunger, said hand lever being disposed in substantially parallel relationship with said conduit.

8. A lubricating device comprising, a barrel adapted for communication with a source of pressure lubricant supply, a movable assembly slidably mounted in said barrel, a compression spring for urging said assembly yieldingly toward the outer end of said barrel, said assembly having a passageway therethrough terminating at one end in a discharge orifice and at its opposite end in a high pressure cylinder and a plunger mounted for reciprocation in said barrel adapted to be thrust into said high pressure cylinder to apply increased pressure to the lubricant in said passageway, said barrel and said plunger including means for clampingly engaging a lubricant receiving fitting upon the forward thrust of said assembly under influence of lubricant under pressure admitted to the nozzle and under the increased lubricant pressure built up by the actuation of said plunger.

9. A lubricating device comprising, a barrel, an element having a discharge passage therethrough slidably mounted in said barrel, means for clampingly engaging said element with a lubricant receiving fitting upon relative longitudinal movement of said element and barrel, a manually operable plunger arranged for reciprocation within said barrel to displace lubricant therein, means for conducting lubricant under pressure into said barrel through said plunger, and a valve for precluding the return of lubricant from said barrel.

10. A lubricating device comprising, a barrel, an element having a discharge passage therethrough slidably mounted in said barrel, means for clampingly engaging said element with a lubricant receiving fitting upon relative longitudinal movement of said element and barrel, a manually operable plunger arranged for reciprocation within said barrel to displace lubricant therein, means for conducting lubricant under pressure into said barrel through said plunger, and a valve for precluding the return of lubricant from said barrel, said clamping means including a hand lever and hand grip arranged in substantially parallel relationship with one another and at substantially right angles to the axis of said barrel.

11. A lubricating device comprising, means providing a lubricant feed passageway terminating at one end in a lubricant discharge orifice, said orifice having walls adapted for contact with a lubricant receiving fitting as during the servicing of the fitting, means for conducting lubricant under relatively low pressure into said passageway, and means in said passageway for subjecting the lubricant under low pressure in the passageway to increased pressure, said last named means being operable conjointly by manual force and by the pressure of the lubricant fed to the passageway under said low pressure.

JOHN L. CREVELING.